United States Patent [19]

Satomi et al.

[11] Patent Number: 5,224,155

[45] Date of Patent: Jun. 29, 1993

[54] CHANGE-OVER SYSTEM FOR AUTOMATIC ANSWERING TELEPHONY AND FACSIMILE RECEPTION

[75] Inventors: Mitsuo Satomi; Akio Nomura, both of Kyoto; Kazuaki Oshita, Hirakata; Tetsuya Kuwahara, Shiga, all of Japan

[73] Assignee: Murata Kikai Kabushiki Kaisha, Kyoto, Japan

[21] Appl. No.: 475,309

[22] Filed: Feb. 5, 1990

[30] Foreign Application Priority Data

Feb. 8, 1989 [JP] Japan .................. 1-29270

[51] Int. Cl.⁵ .................. H04M 11/00; H04M 1/64
[52] U.S. Cl. .................. 379/100; 379/82
[58] Field of Search .................. 379/100, 94, 93, 97, 379/98, 96, 199, 188, 189, 190, 82, 266

[56] References Cited

U.S. PATENT DOCUMENTS

| | | | |
|---|---|---|---|
| 4,266,098 | 5/1981 | Novak | 379/199 |
| 4,729,033 | 3/1988 | Yoshida | 379/100 |
| 4,794,637 | 12/1988 | Hashimoto | 379/100 |
| 4,813,067 | 3/1989 | Hashimoto | 379/100 |
| 4,868,865 | 9/1989 | Ogawa et al. | 379/100 |
| 4,901,343 | 2/1990 | Yamaguchi | 379/100 |
| 4,910,764 | 3/1990 | Bowen | 379/100 |
| 5,014,296 | 5/1991 | Saigano | 379/100 |
| 5,062,133 | 10/1991 | Melrose | 379/102 |
| 5,131,026 | 7/1992 | Park | 379/100 |

*Primary Examiner*—James L. Dwyer
*Assistant Examiner*—Stella L. Woo
*Attorney, Agent, or Firm*—Spensley Horn Jubas & Lubitz

[57] ABSTRACT

A change-over system for automatic answering telephony and facsimile reception in a facsimile apparatus capable of connecting an automatic answering telephone set thereto. The time interval until the automatic answering telephone set reaches an off-hook state from the beginning of the ringing is detected, thereby allowing the time of the beginning of the ringing of the said automatic answering telephone set to be altered by a correction function.

3 Claims, 5 Drawing Sheets

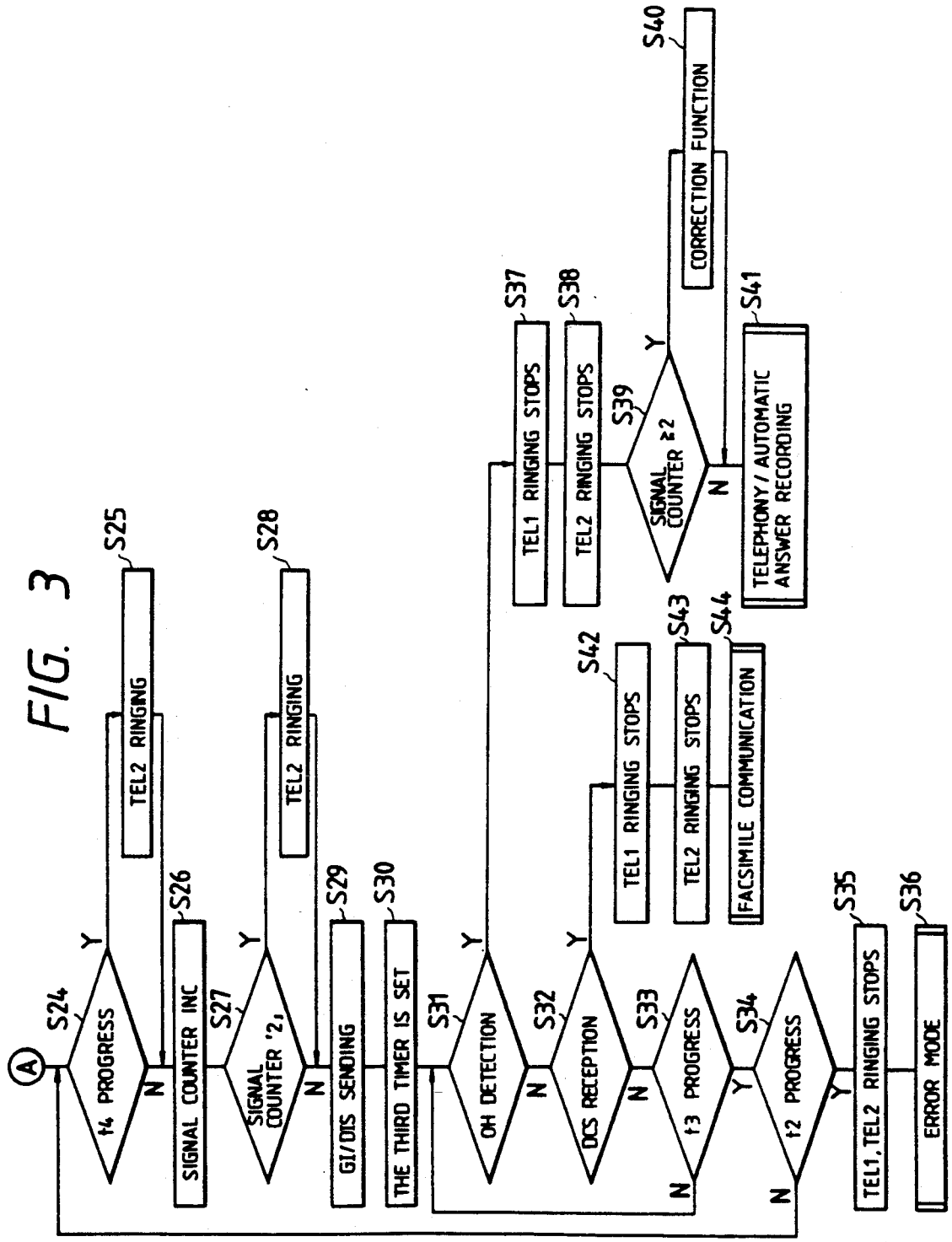

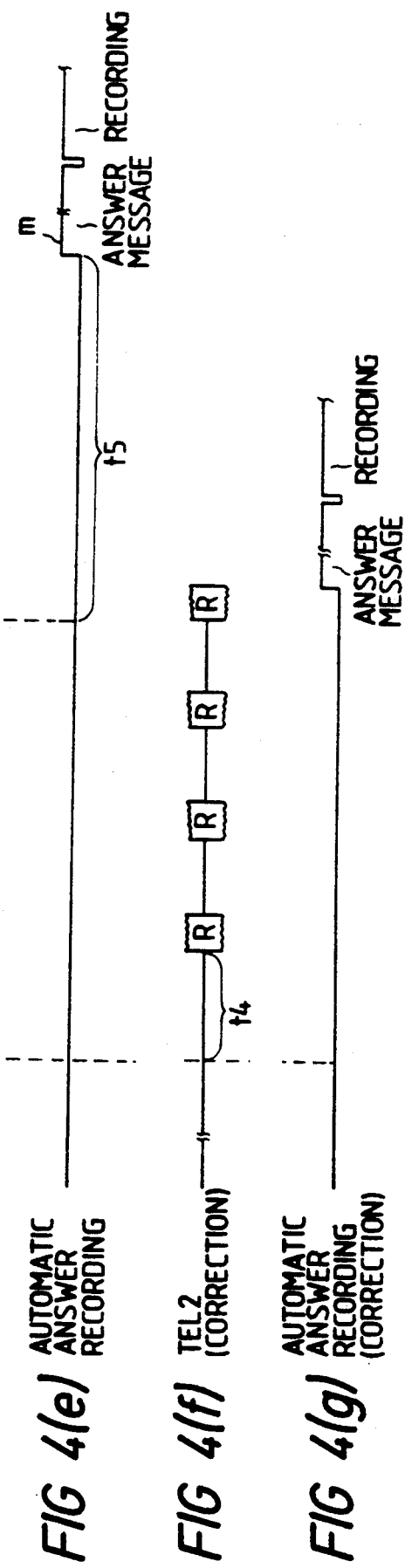

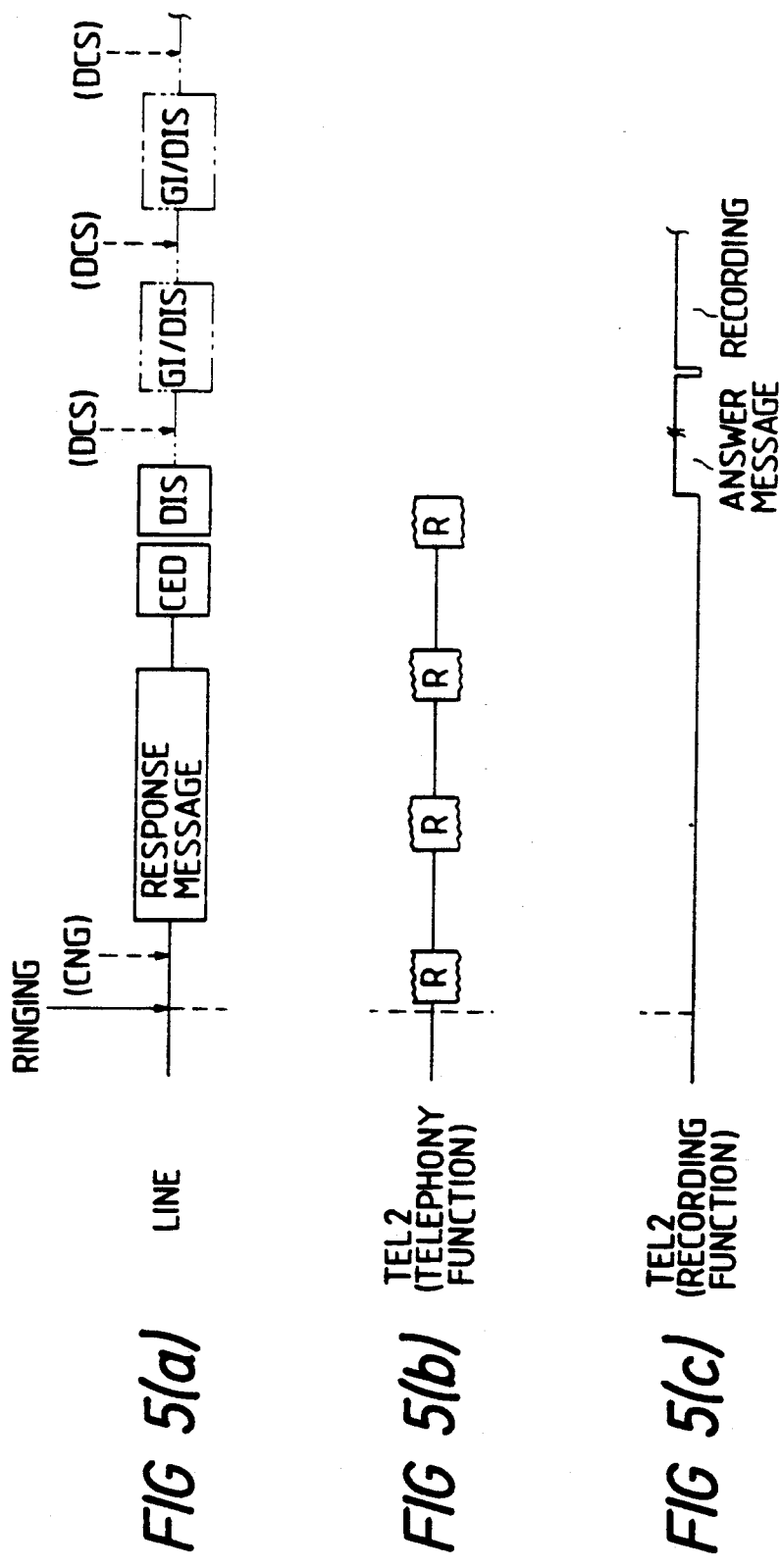

CHANGE-OVER SYSTEM FOR AUTOMATIC ANSWERING TELEPHONY AND FACSIMILE RECEPTION

FIELD OF THE INVENTION

The present invention relates to a change-over system for automatic answering telephony and facsimile reception in a facsimile apparatus capable of connecting an automatic answering telephone set thereto.

RELATED ART STATEMENT

Recently, there is available a change-over apparatus for an automatic answering telephone set and a facsimile apparatus, which connects the facsimile apparatus and the automatic answering telephone set and changes-over them to a telephone circuit.

FIG. 5 is an explanatory diagram (timing chart) showing a change-over system for reception in a conventional apparatus. When a ringing from an originating party side arrives at a terminating party side, a response message is sent out to the originating party side, and subsequently a circuit connecting signal (CED), a digital identification signal (DIS), and a group identification signal (GI) are sent out to the originating party side. On the originating party side, an originating party identification signal (CNG) and then a digital command signal (DCS) are sent in the case of transmission as facsimile. If a facsimile apparatus on the terminating party side detects the CNG signal or the DCS signal, the originating party side is on standby for facsimile communication. Since the CNG signal or the DCS signal is not sent in the case of telephony for conversation from the originating party side, if a number of times of ringing of a bell of an automatic answering telephone set reaches a fixed number of times on the terminating party side, the recording function of the automatic answering telephone set starts and the automatic answer recording begins.

But, in a conventional change-over system for automatic answering telephony and facsimile reception, the number of times of ringing of a bell until the recording function starts is different, depending upon the kind of a connected automatic answering telephone set under existing conditions, and the user side can alter the number of times of the ringing at his option. In FIG. 5, in the case of the kind of the telephone set of which recording function starts with four times of ringing, the recording function operates before the arrival of a DCS signal from the originating party side, and therefore, there is a problem that facsimile communication can not be carried out unless a CNG signal is detected. But, since sometimes the CNG signal is not sent out when a facsimile apparatus on the originating party side is transmitted by a manual operation, there is a problem that it is impossible to carry out facsimile communication by a manual operation. Also, there is a defect that if the number of times of the ringing is increased, a waiting time until recording function starts is made long.

OBJECT AND SUMMARY OF THE INVENTION

It is an object of the present invention to reliably carry out change-over of a connected automatic answering telephone set and a facsimile apparatus without undergoing the influence of the kind of the connected automatic answering telephone set.

The present invention is a change-over system for automatic answering telephony and facsimile reception in a facsimile apparatus capable of connecting an automatic answering telephone set thereto, and, in order to accomplish the above-mentioned object, at the time point when a terminating party side sends out a telephone circuit connecting signal and a digital identification signal to an originating party side, and subsequently sends out a group identification signal, ringing of an automatic answering telephone set at the terminating party side is begun and at the same time, the time interval until the automatic answering telephone set reaches an off-hook state from the beginning of the ringing is detected, thereby allowing the time of the beginning of the ringing of the said automatic answering telephone set to be altered by a correction function.

BRIEF DESCRIPTION OF THE DRAWINGS

FIG. 2 to FIG. 3, each are a flowchart explanatory of operation procedures in the present embodiment;

FIGS. 4(a)-4(g) show a timing chart in the present embodiment; and

FIGS. 5(a)-5(c) show a timing chart showing a conventional example.

DETAILED DESCRIPTION OF PREFERRED EMBODIMENT

Hereinafter a suitable embodiment of a change-over system for automatic answering telephony and facsimile reception according to the present invention will be described in reference to accompanying drawings.

Figure 1:
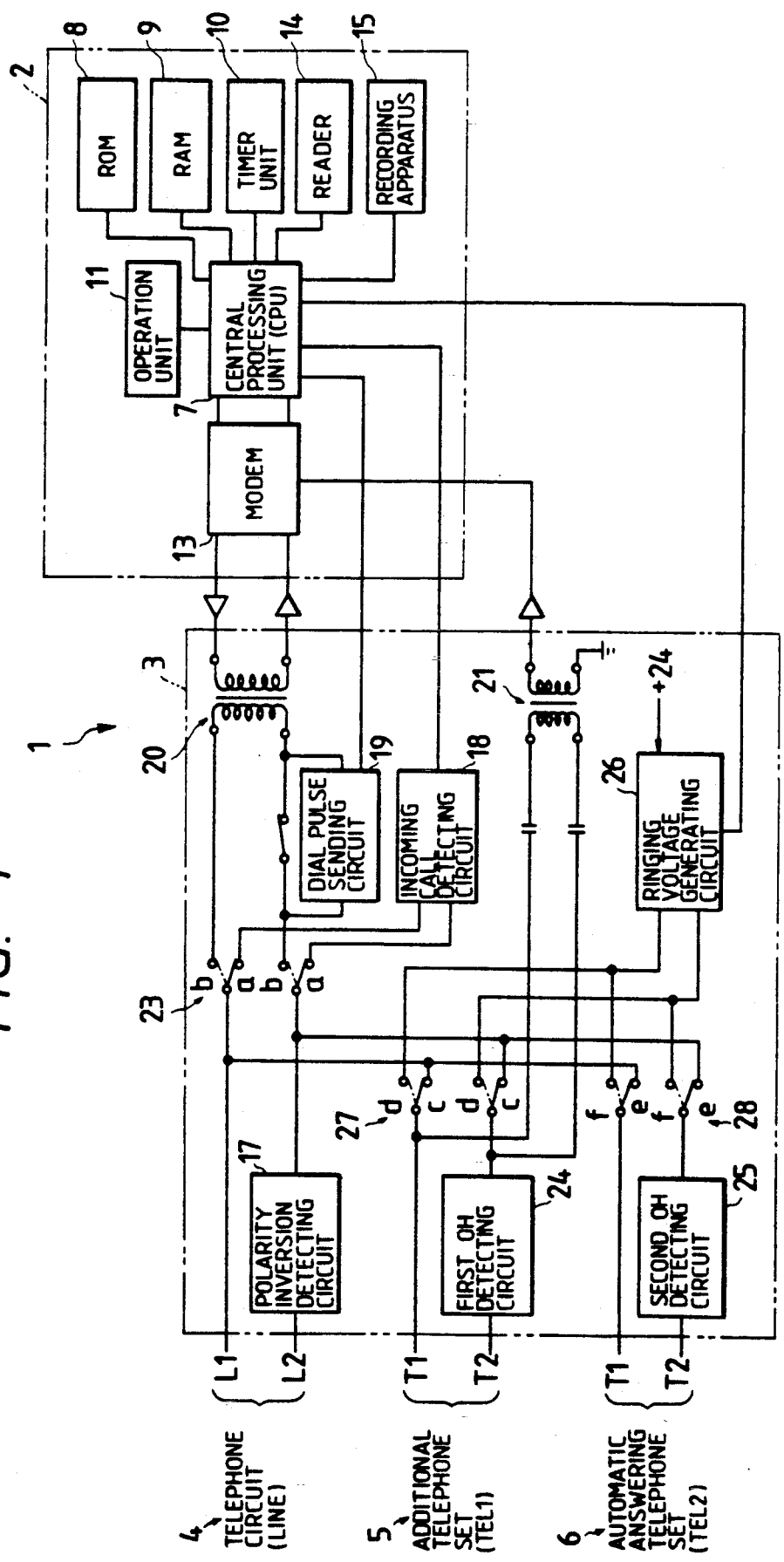
FIG. 1 is a block diagram of a facsimile apparatus for putting the present invention into operation.

FIG. 1 is a block diagram showing a rough constitution of a facsimile apparatus for bringing the present invention into operation.

A facsimile apparatus 1 comprises a main body 2 of the facsimile apparatus provided with a transmission/reception function inherent in the facsimile apparatus and a network control unit (NCU) 3, and the main body 2 of the facsimile apparatus is connected to a telephone circuit 4 via the NCU 3. Reference numeral 5 is an additional telephone set (TEL 1) having a general telephony function, and reference 6 is an automatic answering telephone set (TEL 2) provided with a general automatic answer recording function, and these (TEL 1) 5 and (TEL 2) 6 are connected to the above-mentioned NCU 3.

At first, the main body 2 of the facsimile apparatus will be described. Reference numeral 7 is a central processing unit (CPU) comprising microcomputers, 8 a ROM which stores an operation program of the present facsimile apparatus, and 9 a RAM which stores various kinds of data yielded together with a progress of the program. Reference numeral 10 is a timer which is provided with a first timer (T1), a second timer (T2), a third timer (T3), and a bell timer (T4). Reference numeral 11 is an operation unit which is provided with a ten key, a function key, and the like for carrying out operations for various kinds of inputs. Reference numeral 13 is a modulation/demodulation apparatus (modem), and the modem 13 is provided with a function of generating a push-tone signal corresponding to a telephone number of a remote subscriber. Reference numeral 14 is a reader which reads out picture data of a manuscript through main scanning, converts the read picture data into a binary electrical signal showing white or black, and outputs the binary signal, and reference numeral 15 is a recording apparatus for printing out received picture data on a recording paper.

Next, the constitution of the above-mentioned NCU 3 will be described. Reference numeral 17 is a polarity inversion detecting circuit which detects polarity inversion at the time when a DC route is closed. Reference numeral 18 is an incoming call detecting circuit which detects presence or absence of a ringing (16HZ) incoming thereto from an exchange (not shown) via the telephone circuit 4. Reference numeral 19 is a dial pulse sending circuit which sends out a dial pulse signal corresponding to the telephone number of the remote subscriber at the time of originating a call. Reference numeral 20 is a transformer which is connected to the modem 13 via an amplifier. Also, the incoming call detecting circuit 18 and the dial pulse sending circuit 19 are both connected to the CPU 7. Reference numeral 23 is a CML relay switch which selectively changes-over a signal from the telephone circuit 4 to an "a" state shown by a solid line or a "b" state shown by an alternate long and short dash line for connection. When this CML relay switch 23 is in an "a" state, the telephone circuit 4 and the incoming call detecting circuit 18 are connected, and when this CML relay switch 23 is in a "b" state, the telephone circuit 4 and the modem 13 are connected via the transformer 20.

Also, reference numeral 24 is an OH (off-hook) detecting circuit which detects a state of an off-hook operation of the additional telephone set 5, that is, a state with a telephone receiver hooked off. Reference numeral 26 is a ringing voltage generating circuit which comprises a DC-DC converter having a constant-current characteristic with an input voltage of +24 V DC and an maximum output voltage of +180 V DC and a switch circuit. In the ringing voltage generating circuit 26, a pseudo-ringing signal is generated by a controlled 16 HZ signal from the CPU 7 to supply a constant current of 40 mA to 50 mA when the additional telephone set is in an OH state.

Reference numeral 27 is a relay switch for the first TEL which selectively changes-over a signal from the additional telephone set 5 into a "c" state shown by a solid line or into a "d" state shown by an alternate long and short dash line for connection. When this relay switch 27 for the first TEL is in the "c" state, the additional telephone set 5 and the telephone circuit 4 are connected with each other, and when the relay switch 27 is in a "d" state, the additional telephone set 5 and the ringing voltage generating circuit 26 are connected with each other. Incidentally, a signal via the relay 27 which for the first TEL is connected via a capacitor to the transformer 21, and one end of an output from the transformer 21 is connected via an amplifier to the modem 13 and the other end thereof is connected to an earth terminal, respectively.

Reference numeral 25 is a second OH (off-hook) detecting circuit which detects an off-hook operation of the automatic answering telephone set 6. Reference numeral 28 is a relay switch for the second TEL, which selectively changes-over a signal from the automatic answering telephone set 6 into an "e" state shown by a solid line and a "f" state shown by an alternate long and short dash line for connection. When this relay switch 28 for the second TEL is in an "e" state, the automatic answering telephone set 6 and the telephone circuit 4 are connected with each other, and the relay switch 28 is in a "f" state, the automatic answering telephone set 6 and the ringing voltage generating circuit 26 are connected with each other.

The main body 2 of the facsimile apparatus, the additional telephone set 5, and the automatic answering telephone set 6 are each changed-over efficiently through the relay switches 23, 27, and 28 by the NCU 3 having the above-mentioned constitution and each connected to the telephone circuit 4. Incidentally, the relay switches 23, 27, and 28 usually are each in a waiting state, that is, in an "a", a "c", and an "e" states, respectively.

Incidentally, any automatic answering telephone set generally available in the market can be connected as the automatic answering telephone set 6, and its kind of the set is not particularly limited. For example, the telephone set needs only to have an automatic answer recording function such as IC recording, tape recording, etc. Accordingly, the detailed description will be omitted here.

Next, the operation of the reception change-over system in the facsimile apparatus with the automatic answering telephony function according to the present invention will be described.

Figure 2:
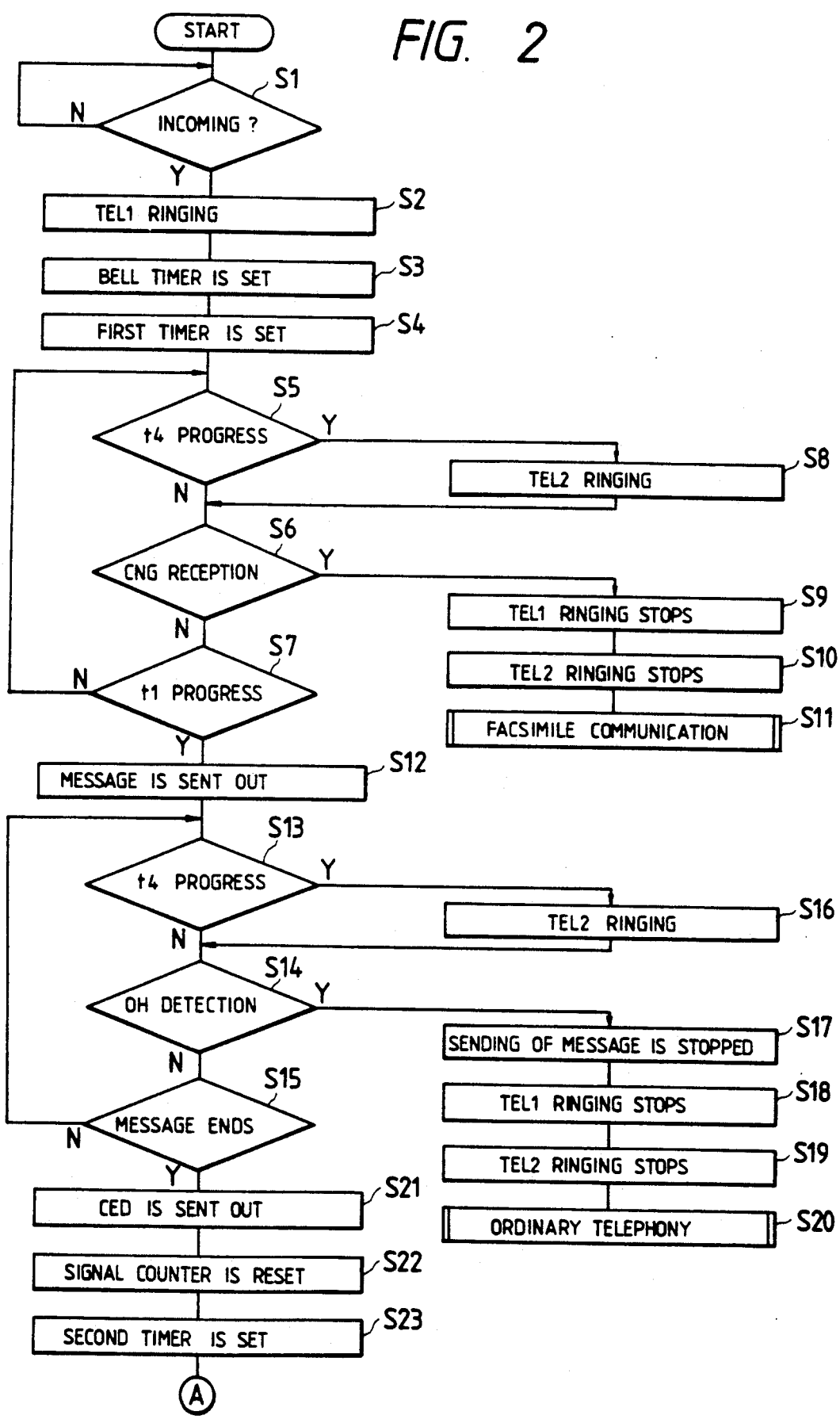

FIG. 2 to FIG. 3 each are a flowchart explanatory of an operation procedure in the present embodiment, and FIG. 4 is a timing chart in the present embodiment.

Incidentally, the description will be given on the assumption that a change-over mode on the operation unit 11 is specified to an automatic answer recording-/facsimile change-over mode. At first, when, in the above-mentioned waiting state, a ringing Ri of 16 HZ arrives at a terminating party side from an originating party side via an exchange, the incoming call detecting circuit 18 detects the ringing and changes-over the relay switch 28 for the second TEL into an "f" state, by which ringing is avoided, and at the same time, a fixed number of times (for example, it is specified to two times or six times beforehand) of ringing of the ringing Ri is detected. (Step 1: hereinafter Step is denoted by S.)

Then, the CML relay switch 23, the relay switch for the first TEL 27, and the relay switch for the second TEL 28 are brought into a "b" state, a "d" state, and an "e" state, respectively, and the additional telephone set 5 begins ringing by the pseudo-ringing R from the ringing voltage generating circuit 26 (S2). In this time, since the automatic answering telephone set 6 does not ring, a recording function operates, as usual, by no means. At the same time, a bell timer T4 (for example, 24 sec. t4) and a first timer T1 (for example, 3 sec. t1) in the timer unit 10 are reset, respectively, to start the timer unit 10 (S3, S4). In the next step (S5), a predetermined time t4 of the bell timer T4 is monitored, and in the case of time-up, ringing of the automatic answering telephone set 6 is begun with the relay switch 28 for the second TEL brought into a "f" state (S8). The arrival of the originating party identification signal (CNG) from the originating party side is detected by the modem 13 and the CPU 7 (S6). Incidentally, the CNG signal is one which is sent out from the facsimile apparatus on the originating party side at the time of automatic transmission. In the step (S6), if the arrival of the CNG signal is detected, it is decided that the originating side is a facsimile apparatus, and the generation of the pseudo-ringing is stopped by the ringing voltage generating circuit 26, thereby stopping ringing of the additional telephone set 5 (S9), and at the same time, if the automatic answering telephone set 6 is ringing, its ringing is stopped (S10), and the terminating party side waits for facsimile communication (S11). Incidentally, in this facsimile communication, the relay switches 23, 27 and 28 are in a "b", a "d", and a "f" states, respectively. The above-mentioned operation steps (S5 to S7) are repeated for the detection of the CNG signal by the first timer T1 (S7) until the predetermined time t1 elapses.

When the predetermined time t1 elapses due to the first timer T1, the CPU 7 reads an audio response message stored in the RAM 9 beforehand, sends it to the modem, converts it into an audio signal, and then outputs the audio signal on the circuit 4 via the NCU 3 (S12). If this audio response message M needs only to be such a message as "This is a facsimile apparatus and automatic answering telephone set. A person who wants us is asked to facsimile after ringing of "poro-poro" is heard. A person who calls us is asked to wait for a moment." or the like. In steps S13 and S16, the same operations as those in the steps S5 and S8 are carried out, and next, an off-hook operation of the additional telephone set 5 is monitored by the first OH detecting circuit 24. (S14). If the additional telephone set 5 is off-hooked by a terminating subscriber, the output of the audio response message M is stopped (S17), the same operations as those in the steps (S9) and (S10) are carried out in the steps (S18) and (S19), the terminating party side carries out telephony communication (S20). In this time, if the originating party side is a facsimile apparatus, the terminating party side can be changed-over to manual reception. Then, the above-mentioned operation steps (S13 to S15) are repeated until the output of the audio response message M ends (S15).

Then, the terminating party side sends out the circuit connecting signal (S21), resets a signal counter provided in the CPU 7 (it counts the sending number of times of the DIS signal) (S22), resets and starts the second timer T2 (for example, 35 sec. t2) (S23). The same operations as those in the steps (S5) and (S8) are carried out in steps (S24) and (S25), the signal counter is incremented (added with +1) (S26), and next, it is decided whether the signal counter indicates "2" or not (S27). Here, when the signal counter indicates "2", the process proceeds to a step (S28) once, the relay switch 28 for the second TEL is brought into an "f" state, and ringing of the automatic answering telephone set 6 is begun. Then, in a step (S29), the group identification signal (GI) and the digital identification signal (DIS) are sent out from the terminating party side. But, when the above-mentioned signal counter indicates "1", the GI signal is not sent out.

Next, the third timer T3 (for example, 3 sec. t3) is reset and made to start (S30), the off-hook operations of the additional telephone set 5 and the automatic answering telephone set 6 are monitored by first and second OH detecting circuits 27 and 28(S 31), and at the same time, an answer message (m) from the automatic answering telephone set 6 is monitored. By the way, the answer message (m) is a response message before recording with which a general automatic answering telephone set is provided.

Next, the arrival of the digital command signal (DCS) or the group command signal (GC) from the originating party side is monitored on the terminating party side (S32), if the arrival is detected, it is decided that the originating party side is a facsimile apparatus, and the ringing voltage generating circuit 26 stops the generation of the pseudo-ringing, by which the additional telephone set 5 and the automatic answering telephone set 6 stop ringing (S42) and (S43), and at the same time, facsimile communication is made to stand by (S44). Incidentally, in this facsimile communication, the relay switches 23, 27, and 28 are in a "b", a "d", and a "f" states, respectively. The above-mentioned operation steps (S31 to S33) are repeated until the predetermined time t3 based on the above-mentioned third timer T3 elapses.

When the predetermined time t3 elapses, the progress of the predetermined time t2 based on the second timer T2 is checked in a step (S34). If the progress of time is within the predetermined time t2, the process proceeds to the step S24, and the above-mentioned steps S24 to S34 are repeated. If the predetermined time t2 elapses in the step S34, the same operations as those in the steps S42 and S43 are carried out in the step S35, and the process proceeds to an error mode (S36). In the error mode, it is cited that a connected automatic answering telephone set is not specified to an automatic answer recording mode, etc.

On the other hand, when the additional telephone set 5 or the automatic answering telephone set 6 is off-hooked in the above-mentioned step S31, the ringing voltage generating circuit 26 stops the generation of a pseudo-ringing, by which ringing stops (S37) (S38), telephone communication or automatic answer recording begins (S41). Incidentally, the relay switches 23, 27, and 28 are in an "a", a "c" and an "e" states in this time, respectively.

Incidentally, in the present embodiment, a correction function (study function) is provided so as to automatically alter (set) the time of the beginning of ringing of the automatic answering telephone set 6, that is, the predetermined time t4 based on the bell timer T4. If this is described concretely, the predetermined time t4 is set to, for example, 24 sec. in the above-mentioned embodiment. But, when the signal counter indicates a value > 2 in a step S39, the time interval t5 until the automatic answering telephone set 6 is brought into an off-hook state from the beginning of ringing thereof is detected by the CPU 7, and if the t5 is, for example, 20 sec. (See (e) in FIG. 4), the timing chart of the automatic answering telephone set 6 is corrected like (f) and (g) in FIG. 4 by the present correction function. Accordingly, the predetermined time t4 is altered (set) to, for example, 6 sec. and the time interval from the time point of connection (A) to the starting time point of the automatic answer recording is reduced like from (e) in FIG. 4 to (f) in FIG. 4. In other words, in the case where the originating party side carries out communication using telephony, the waiting time till a message is sent is reduced.

Incidentally, in the present embodiment, it is desirable to apply the correction function after the third time (including the third time) the automatic answering telephone set operates in consideration of difference in performances and the like of the connected automatic answering telephone set.

Incidentally, though, in the above-mentioned embodiment, an example in which the automatic answering telephone set 6 and the additional telephone set 5 are connected to the facsimile apparatus provided with the network control apparatus 3 is described, the present invention may be, of course, put into operation in the combination with such those apparatus as built-in or given independence with each other in the range without departing from the gist thereof.

As described above in detail, according to the present invention, the change-over of the facsimile reception and the automatic answering telephony can be certainly and easily carried out without undergoing any influence of the kind of a connected automatic answering telephone set, and also since the beginning time of ringing of an automatic answering telephone set is automatically altered by its correction function, the waiting time till a message is sent can be reduced in the case where the originating party side carries out communication using telephony.

What is claimed is:

1. A change-over system for automatically answering telephony and facsimile reception in a facsimile apparatus capable of connecting an automatic answering telephone set thereto, characterized in that at the time point when a terminating party side sends out a circuit connecting signal and a digital identification signal to an originating party side, and subsequently sends out a group identification signal, ringing of the automatic answering telephone set at the terminating party side is begun, and at the same time, the time interval until the automatic answering telephone set is brought into an off-hook state from the beginning of the ringing is detected, thereby allowing the time of the beginning of the ringing of the automatic answering telephone set to be altered by a correction function.

2. A facsimile apparatus comprising:
a main body including a processing unit;
a network control unit, separate from the main body, operably connecting the main body to a telephone circuit, an additional telephone set and an automatic answering telephone set having a recording device controlled by the automatic answering telephone set, the network control unit including relay switches for selectively connecting the main body, the additional telephone set, and the automatic answering telephone set to the telephone circuit, and initialization means for initializing the automatic answering telephone set after a predetermined period; and
correction means for reducing the predetermined period in response to a previous call wherein the additional telephone was not answered and a digital command signal was not received prior to a sending of a predetermined number of digital identification signals.

3. The facsimile apparatus of claim 2, wherein the initialization means comprises a ringing voltage generator which generates a ringing signal to initialize the automatic answering telephone set.

* * * * *